United States Patent
Bissoli

(10) Patent No.: US 8,602,767 B2
(45) Date of Patent: Dec. 10, 2013

(54) CUTTING UNIT FOR A THERMOFORMING MACHINE OR PRESS AND A THERMOFORMING MACHINE EQUIPPED WITH SUCH CUTTING UNIT

(75) Inventor: Giancarlo Bissoli, Verona (IT)

(73) Assignee: OMV Machinery S.r.L. (IT)

( * ) Notice: Subject to any disclaimer, the term of this patent is extended or adjusted under 35 U.S.C. 154(b) by 289 days.

(21) Appl. No.: 12/984,672

(22) Filed: Jan. 5, 2011

(65) Prior Publication Data

US 2011/0165281 A1  Jul. 7, 2011

(30) Foreign Application Priority Data

Jan. 5, 2010 (IT) .............................. VR2010A0001

(51) Int. Cl.
*B29C 51/32* (2006.01)

(52) U.S. Cl.
USPC ........... 425/292; 425/290; 425/306; 425/308; 425/310; 425/316; 264/145; 264/163

(58) Field of Classification Search
CPC ...... B29C 51/32; B29C 51/325; B29C 51/44; B29C 2793/0036; B29C 2793/0045; B29C 2793/00545
USPC ......... 425/292, 295, 298, 300, 308, 310, 394, 425/395, 396, 398, 290, 299, 303, 316; 264/145, 146, 157, 163
See application file for complete search history.

(56) References Cited

U.S. PATENT DOCUMENTS 2,864,123 A * 12/1958 Gora ............................ 264/153
3,475,526 A * 10/1969 Seto ............................. 264/153
3,518,334 A *  6/1970 MacLam et al. ............. 264/544

(Continued)

FOREIGN PATENT DOCUMENTS

CH  582604 A5  12/1976
EP  1275580 A1   1/2003

(Continued)

OTHER PUBLICATIONS

Italian Search Report issued by the EPO and dated Sep. 10, 2010, issued in corresponding priority Italian application No. IT VR20100001.

(Continued)

*Primary Examiner* — Seyed Masoud Malekzadeh
(74) *Attorney, Agent, or Firm* — Ostrolenk Faber LLP

(57) ABSTRACT

The present disclosure relates to an in-mold cutting unit for a thermoforming machine having at least one mold element (4), at least one counter-mold element (5) intended to cooperate, in use, with a respective mold element (4), and actuation means intended to command the relative movement of the mold (4) and countermold (5) elements; the cutting unit comprising at least one annular knife element (60) having a sharp edge (61), and at least one counter-cutting element (7) for each knife element (60), defining a sharp counter-edge portion (71), and the in-mold cutting unit comprising at least one witness-forming insert (8) removably housable in a respective reception seat (S) at the at least one annular knife element (60) or the at least one counter-cutting element (7), and delimiting at least one recess or incision (89) thereon, during use very close to the sharp edge (61) of the annular knife element (60) or to the sharp counter-edge portion (71) for the formation of a respective witness (T) between a thermoformed object (TO) and residual web (2a).

10 Claims, 3 Drawing Sheets

(56) References Cited

U.S. PATENT DOCUMENTS

| | | | | |
|---|---|---|---|---|
| 3,523,474 A * | 8/1970 | Kinslow, Jr. | | 83/40 |
| 3,685,251 A * | 8/1972 | Mahaffy et al. | | 53/559 |
| 3,711,005 A * | 1/1973 | Neil | | 226/52 |
| 3,801,244 A * | 4/1974 | Eisenberg | | 425/102 |
| 3,808,927 A * | 5/1974 | Neil | | 83/228 |
| 3,817,140 A * | 6/1974 | Neil | | 83/635 |
| 4,048,781 A * | 9/1977 | Johansen | | 53/453 |
| 4,086,045 A * | 4/1978 | Thiel et al. | | 425/326.1 |
| 4,105,386 A * | 8/1978 | Thiel et al. | | 425/217 |
| 4,105,736 A * | 8/1978 | Padovani | | 264/153 |
| 4,236,885 A * | 12/1980 | West et al. | | 425/514 |
| 4,477,243 A * | 10/1984 | Wallsten | | 425/292 |
| 4,612,153 A * | 9/1986 | Mangla | | 264/154 |
| 4,755,129 A * | 7/1988 | Baker et al. | | 425/292 |
| 4,844,852 A * | 7/1989 | Keyser et al. | | 264/153 |
| 4,909,721 A * | 3/1990 | Warburton | | 425/289 |
| 5,032,106 A * | 7/1991 | Warburton | | 425/292 |
| 5,114,651 A * | 5/1992 | Warburton | | 264/156 |
| 5,135,381 A * | 8/1992 | Evans | | 425/308 |
| 5,213,741 A * | 5/1993 | Robbins, III | | 264/151 |
| 5,453,237 A * | 9/1995 | Padovani | | 264/153 |
| 5,595,769 A * | 1/1997 | Castner et al. | | 425/183 |
| 5,904,891 A * | 5/1999 | Mizuno | | 264/544 |
| 6,073,422 A * | 6/2000 | Massey et al. | | 53/471 |
| 6,435,067 B1 * | 8/2002 | Irwin | | 83/228 |
| 6,662,531 B1 * | 12/2003 | Schwab et al. | | 53/453 |
| 6,722,237 B2 * | 4/2004 | Irwin | | 83/13 |
| 2002/0178886 A1 * | 12/2002 | Irwin | | 83/228 |
| 2003/0089452 A1 * | 5/2003 | Hansen et al. | | 156/268 |
| 2003/0122277 A1 * | 7/2003 | Padovani | | 264/163 |
| 2004/0111858 A1 * | 6/2004 | MacKenzie et al. | | 29/412 |

FOREIGN PATENT DOCUMENTS

| | | |
|---|---|---|
| EP | 1319493 A1 | 6/2003 |
| FR | 2644425 A1 | 9/1990 |
| JP | 10-315315 A | 12/1998 |

OTHER PUBLICATIONS

Written Opinion issued by the Italian Patent Office and dated Sep. 10, 2010, issued in connection with the corresponding priority Italian application No. IT VR20100001.

* cited by examiner

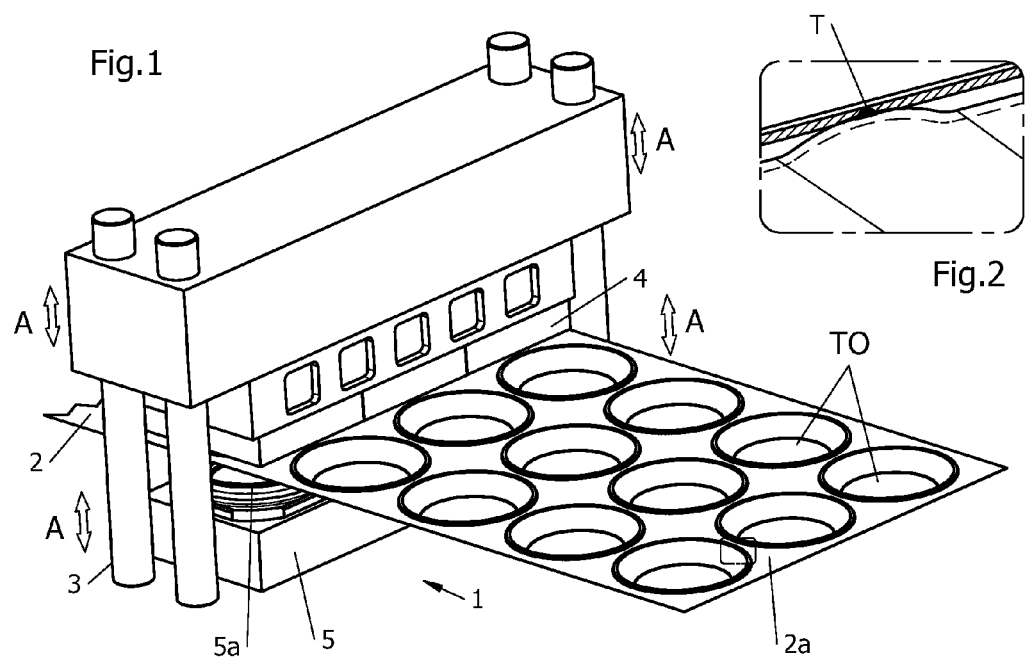
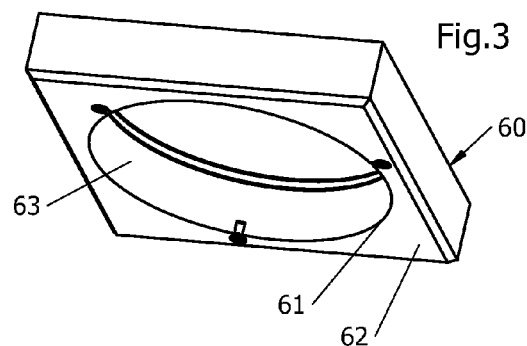
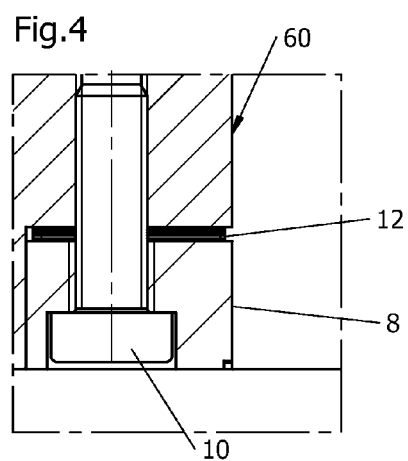
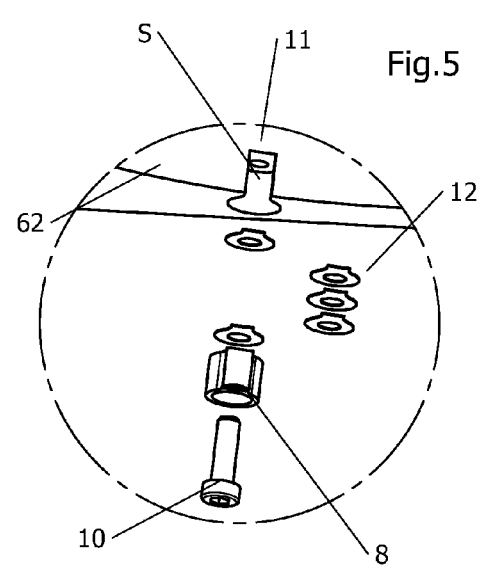

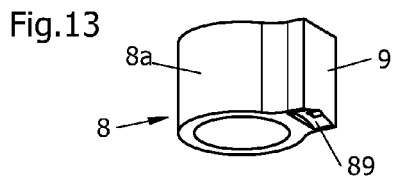 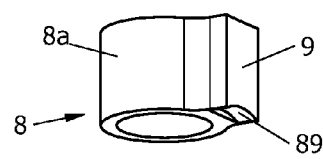
Fig.13　Fig.14
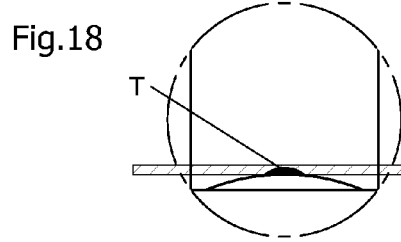 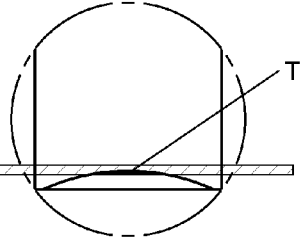
Fig.18　Fig.19
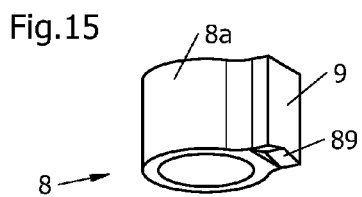 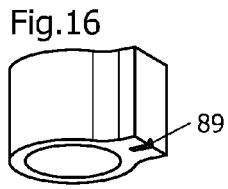 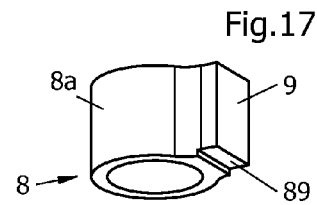
Fig.15　Fig.16　Fig.17
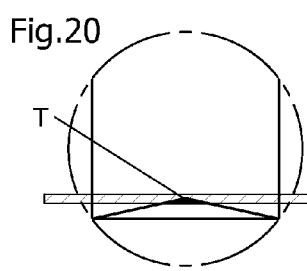 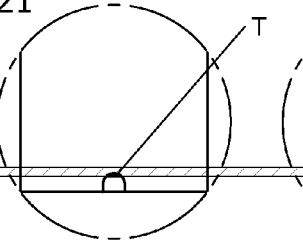 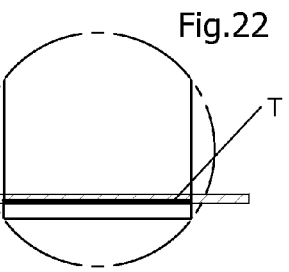
Fig.20　Fig.21　Fig.22
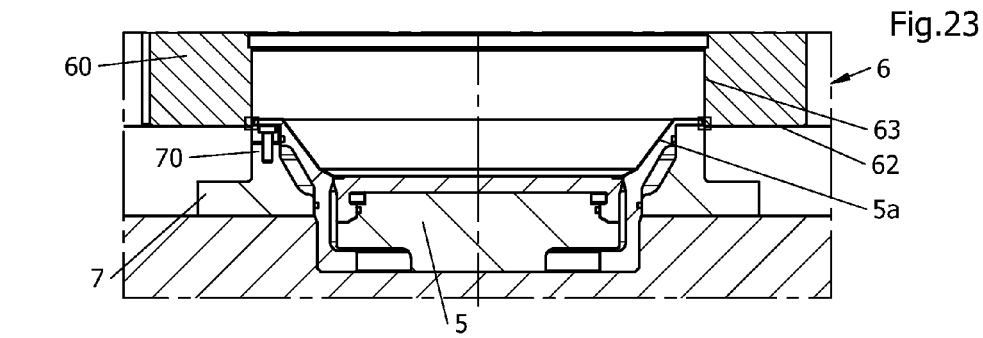
Fig.23
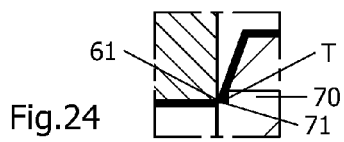 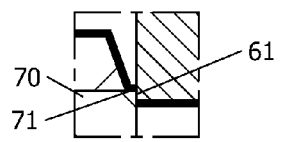
Fig.24　Fig.25

CUTTING UNIT FOR A THERMOFORMING MACHINE OR PRESS AND A THERMOFORMING MACHINE EQUIPPED WITH SUCH CUTTING UNIT

FIELD OF INVENTION

The present invention refers to a cutting unit for a thermoforming machine or press as well as a machine equipped with such unit.

BACKGROUND OF INVENTION

Thermoformed objects are generally produced from a continuous sheet of thermoformable material that after having been suitably laminated is fed while being still hot between mold and the countermold of a thermoforming machine, and is then thermoformed by bringing the mold and countermold in abutment against each other. One or more thermoformed objects are thus obtained, while the remaining material of the sheet, termed "residual web" in jargon, is removed and suitably recycled.

The thermoformed object or objects thus obtained are extracted from the thermoforming mold by means of a suitable extractor device, or as provided for according to the present invention, they are extracted by the residual web itself, to which they remain anchored at thin cords or "witnesses"; from which they will subsequently be separated in any suitable manner, e.g. via breakage, cutting or the like.

More particularly, according to the most frequently used technology, the male mold and the respective female countermold of a thermoforming press are configured, as is known, so as to perfectly peripherally penetrate each other with sharp edges—likewise a cutting device intended to carry out the cutting or separation of the peripheral edge of each object once thermoformed, and the surrounding residual web (non-thermoformed plastic material sheet), except for some thin, angularly-spaced portions, the "witnesses". The witnesses must be sufficiently strong to maintain the thermoformed objects anchored to the residual web, but at the same time their size must be as small as possible in order to not leave any visible trace in the finished thermoformed product. In practice, a small enlargement integral with the object always remains at the position of each witness, which is detected by the user of the object at the time of use—both via touch and sight, and constitutes a visible and tactile defect of the thermoformed product, a defect which negatively affects the quality of the finished thermoformed product.

The attachment portions or witnesses are obtained by providing for an incision or recess of predetermined configuration in the sharp edge of the male mold element and/or female countermold at a respective (angular) position along the edge. The incisions are usually executed only on the male mold or on the female countermold. Considering that there are various thermoformable plastic materials used for obtaining thermoformed objects, with very different physical characteristics from each other (tenacity, fragility, ductility, elongation, stretching, etc.), it is necessary to use specific configurations of the incisions for the various materials.

In addition, after a number of cuts or after a fairly long use time interval, the sharp edges at least of the male mold must be restored by means of grinding, since the recess or incisions intended to generate the witnesses are made directly on the cutting or sharp edge of the molds/countermolds, and they undergo a configuration alteration following the grinding of the respective mold. The restoration operation of such configuration after each grinding of the respective mold is rather difficult and quite costly, since it requires the use of special machine tools, which can involve a (press) machine downtime of even several days, with damaging consequences on the productivity of a thermoforming plant. See the patent EP-1 319 493 B1, for example.

SUMMARY OF THE INVENTION

The main object of the present invention is therefore to provide an in-mold cutting unit for a thermoforming (press) machine which is versatile and which allows making thermoformed objects of high quality, totally free of defects due to the witnesses, at least in the sense that such defects cannot be detected by touch or sight.

Another object of the present invention is to provide a cutting unit suitable for allowing a quick and effective separation of a thermoformed object from the respective residual web substantially without marks.

Another object of the present invention is to provide a cutting unit which is simple and quick to sharpen and restore.

Another object of the present invention is to provide a cutting unit that is easily adaptable to different types of thermoformable material to be thermoformed.

Another object of the present invention is to considerably increase the productivity of a thermoforming press over the long term.

Not least object of the present invention is to provide a method for restoring a cutting unit that is simple and quick to be implemented.

According to a first aspect of the present invention, an in-mold cutting unit is provided for a thermoforming machine having at least one mold element, at least one countermold element designed to cooperate, in use, with a respective mold element, and actuation means designed to control the relative movement of the mold and countermold elements;

the cutting unit comprising:
at least one annular knife element having a sharp edge,
at least one counter-cutting element for each knife element, defining a counter-cutting edge portion, and
at least one witness-forming insert removably housable in a respective receiving seat at the at least one annular knife element or the at least one counter-cutting element, and delimiting at least one recess or incision thereon, in use very close to the sharp edge of the annular knife element or to the sharp counter-cutting portion for the formation of a respective witness between a thermoformed object and residual web.

According to another aspect of the present invention, a method is provided for restoring a cutting unit according to the present invention comprising the following steps:
removing, from at least one annular knife element or from at least one counter-cutting element, each insert anchored therein;
grinding the at least one annular knife element or the at least one counter-cutting element; and
repositioning each insert in the annular knife element or in the counter-cutting element.

BRIEF DESCRIPTION OF THE DRAWINGS

Further characteristics and advantages of the present invention will be clearer from the following detailed description of preferred embodiments of a cutting unit, description made with reference to the accompanying drawings, in which:

FIG. 1 is a slightly from above perspective view of a thermoforming press with an in-mold cutting unit according to the present invention in mold (male and female) open step and with the thermoformed objects attached to the residual web at witnesses;

FIG. 2 shows an enlarged scale detail of FIG. 1;

FIG. 3 is a slightly from below perspective view of a component of an in-mold cutting unit according to the present invention;

FIG. 4 is an enlarged scale cross-section view of a removable insert housed and anchored in the component of FIG. 3;

FIG. 5 is an exploded and reduced scale view of the detail of FIG. 4;

FIGS. 13 to 17 are slightly from below perspective views which illustrate respective embodiments of inserts housable in a mold element or in a counter-mold element for an in-mold cutting unit according to the present invention;

FIGS. 18 to 22 are cross section views of witnesses obtainable with the inserts of FIGS. 13 to 17, respectively;

FIG. 23 is a cross section view with parts omitted for the sake of clarity of another in-mold cutting unit embodiment according to the present invention with inserts provided for at the counter-cutting edge of the female mold; and FIGS. 24 and 25 are enlarged scale cross-section views of a detail at two opposite positions (one with and one without insert) of the edge of a thermoformed object in the in-mold cutting unit of FIG. 23.

In the accompanying drawings, equivalent or similar parts or components were indicated with the same reference numerals.

DETAILED DESCRIPTION OF THE PREFERRED EMBODIMENTS

Figure 6:
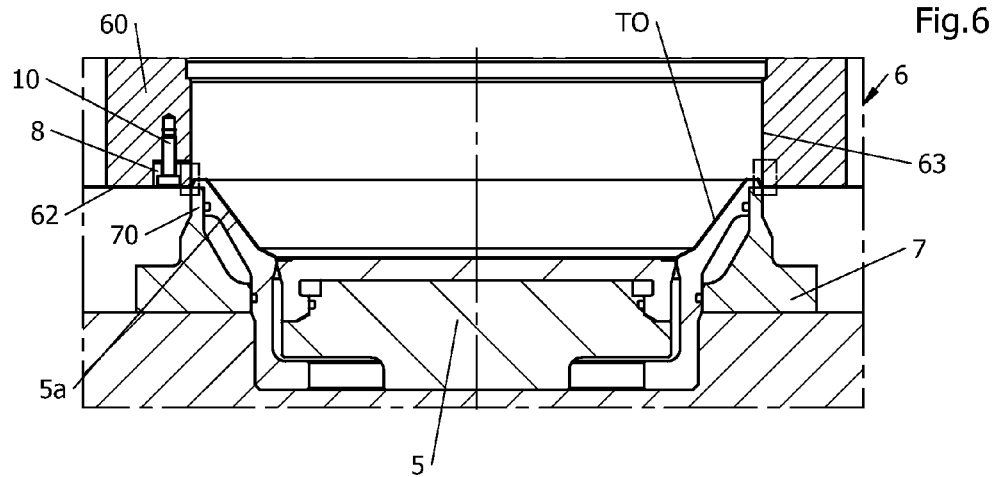
FIGS. 6 and 7 are each a cross-section view with parts omitted for the sake of clarity of a thermoforming mold with in-mold cutting unit in two operating steps: before and after a cutting in the mold.
Figure 8:
FIGS. 8 and 9 each show an enlarged scale detail at diametrically opposed positions of the edge of a just-thermoformed object, immediately before an in-mold cutting operation of the molding-cutting unit of FIG. 6.
Figure 9:
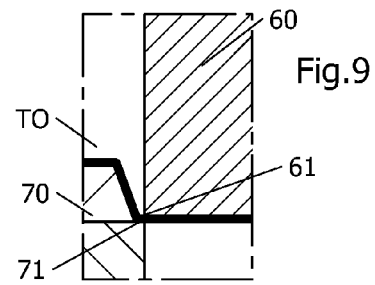
Figure 7:
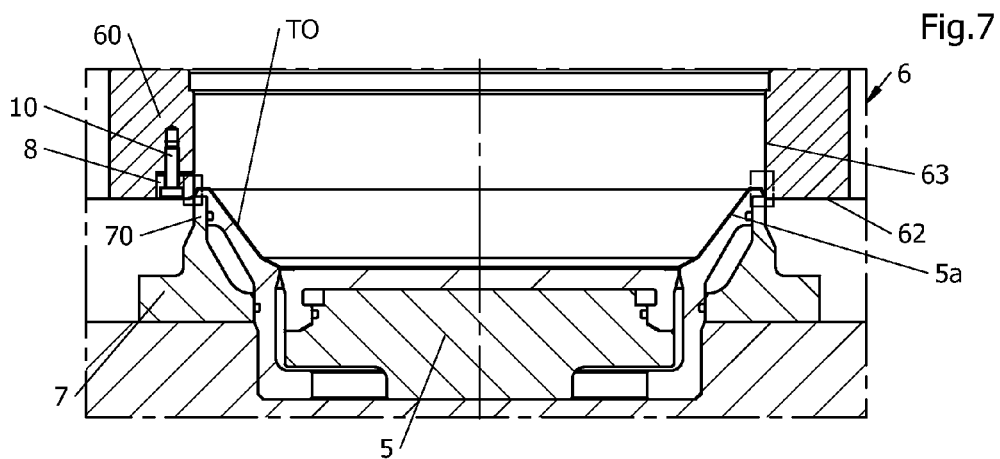
Figures 10, 11, 12:
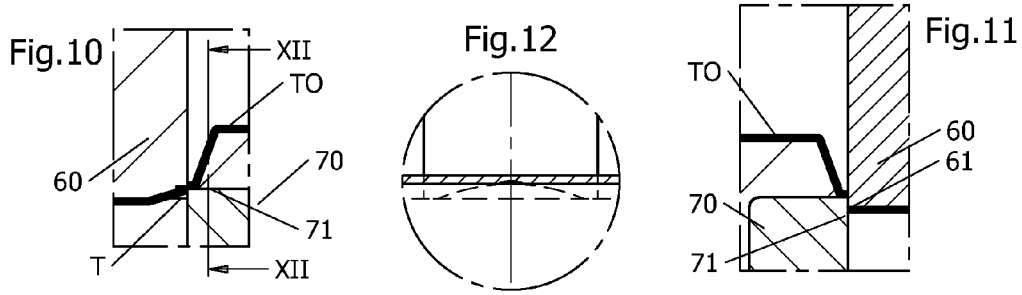
FIGS. 10 and 11 are each a view of an enlarged scale detail as in FIGS. 8 and 9, but in the condition immediately after an in-mold cutting operation.
FIG. 12 is an enlarged scale cross-section view taken along the line XII-XII of FIG. 10.

First, with reference to FIGS. 1 to 12, a thermoforming and in-mold cutting machine 1 according to the present invention is illustrated, having, as is known in the state of the art, a support framework generically indicated with 3, a (e.g. upper) male mold element 4, and a (e.g. lower) countermold element or female mold 5, supported by the framework 3. One or both male 4 and female 5 molds are slidably mounted on the framework 3 so that they can be brought close to each other/far from each other in use (arrows A in FIG. 1). For such purpose, suitable drive means are provided for, as it is known in the state of the art, such as a motor-toggle group, suitable for imparting a mutual approaching/moving away from motion.

The countermold element 5 delimits one or more thermoforming cavities 5a, whereas the male mold 4 can be equipped with many pad elements (not illustrated in the drawings), at least equal to the number of thermoforming cavities 5a with which they are intended to be engaged. In such a manner, each pad can contribute to thermoforming a respective portion of a thermoformable material sheet 2 within the respective thermoforming cavity 5a for the obtainment of a thermoformed object TO.

The thermoforming and in-mold cutting machine 1 comprises a cutting unit 6 according to the present invention, which typically includes an annular cutting element 60 (FIG. 3) intended to be arranged, in use, around at least one respective pad (not shown in the drawings) and having a sharp edge 61 delimited between a flat head surface 62 and an adjacent inner surface 63 extended perpendicular to the head surface 62 and delimiting an inner opening corresponding to the border or edge of a thermoformed object TO to be obtained. Advantageously, each knife element 60 is movable together with its respective mold 4.

Naturally, even if the mold 4 lacked pads, each annular knife 60 is preferably moved together with the mold.

The cutting unit 6 also comprises a counter-cutting element 7 for each knife element 60, which is preferably constituted by the embossed annular edge 70 of the respective thermoforming cavities 5a in the countermold or female mold 5 (FIGS. 6 and 7) and has perfectly complementary shape with respect to the configuration of the inner opening of the respective annular knife element 60. More particularly, the embossed annular edge 70 has a ground peripheral surface sized so as to be perfectly insertable in the opening delimited by the respective knife element 60 and defining a sharp counter-edge portion 71 at the head. The counter-cutting element 7 is annular and movably mounted, for example, with the respective counter-mold element 5.

With such structure of an in-mold cutting unit, each knife element 60 and each counter-cutting element 7 in the countermold 5 are intended to be engaged, penetrating each other in order to cut a sheet of thermoformable material 2 at a section thereof situated between the male mold and the female mold, so as to nearly entirely separate (as will be further explained below) each object TO, thermoformed in the thermoforming mold, from the residual web 2a.

A feature of the present invention is the fact that it provides for one or more witness-forming inserts 8, removably anchorable at the sharp edge 61 of the knife element 60 or at the sharp counter-edge portion 71 of the counter-cutting element 7. Preferably, three or more witness-forming inserts 8 are provided for, regularly arranged angularly spaced from each other at each annular knife element 60 (FIG. 3) or counter-cutting element 7.

Each insert can be advantageously made of steel, even not of the same type and hardness as that which constitutes the annular knife element 60.

More particularly, in each witness-forming insert 8, a respective recess or incision 89 is formed which, in use, is found very close to the sharp edge 61 of annular knife element 60 or outside the sharp counter-edge portion 71 of the counter-cutting element 7; preferably, the recess 89 in use extends transversely with respect to the annular knife element 60 or to the counter-cutting element 7. In addition, if the insert is/inserts are arranged in the annular knife element 60, then it is/they are in communication with the inner opening delimited by the annular knife element 60.

The presence of the recesses or incisions 89 allows not entirely breaking off the thermoformed objects TO from the residual web 2a, since a small integral portion of thermoformed material (in jargon termed witness T) remains at such recesses or incisions.

Preferably, each insert 8 comprises a main cylindrical body starting from a portion of the lateral surface 8a, from which a projecting or embossed block 9 extends, the incision or recess being delimited at one end of the block 9 so as to be situated, in use, at/very close to the sharp edge 61 of the annular knife 60 or outside the sharp counter-edge 71 of the counter-cutting element 7.

One such insert is positionable in a respective housing seat S obtained in the annular knife element 60 or in the counter-cutting element 7, and can be fixed in position, e.g., by means of a screw 10 insertable in the through opening delimited by the cylindrical body 8a and engageable, e.g. by screwing, with a hole 11 obtained on the bottom of the respective seat S.

It is also possible to prearrange one or more shims or spacers, e.g. washer-like 12, arranged between the bottom of the seat S and respective insert 8. Such shims 12 carry out the double role of allowing precision adjustment of the position of each insert with respect to the annular knife element 60 or to the counter-cutting element 7 and restoring the position of the insert following the restoring or sharpening operations of the cutting unit by means of grinding. As is known, the sharpening is made through removal of material, with flat grinding of the knife cutting element or of the counter-cutting element. Usually, after each sharpening operation, a material layer of very specific thickness is removed, and the (washer-like) spacers or shims 12 are preferably made with a thickness corresponding to the material layer removed during the sharpening. After a sharpening operation, therefore, it will be sufficient to remove a washer, thus restoring the correct positioning of the insert with respect to knife jacket. As an alternative to the use of shims or spacers, restoring operations can also be carried out on the bottom of each reception seat S.

Alternatively, the cutting unit can also comprise moving together/moving away means (motors) for the knife element 6 and the counter-cutting element 7, so as to command their relative movement and the localized cutting of the thermoformable material sheet in an independent manner between the mold and countermold.

With one such cutting unit, a sheet 2 of thermoformable material is fed between the mold and countermold that have been mutually moved away from each other, i.e. with open molding unit. The moving together/moving away means (motors) are thus actuated so as to close the thermoforming unit (see FIGS. 8 and 9).

At this point, the closure or moving together is commanded, with controlled penetration of the cutting element and counter-cutting element. In such a manner, the object or the thermoformed objects TO are cut or separated from the residual web 2a along a respective border line, except for the zones situated at the recesses or incisions 89 in the inserts which will constitute the witnesses T; here, instead, each thermoformed object will remain anchored to the residual web 2a (see FIGS. 10 and 11 in particular).

The thermoforming and cutting unit is once again opened and the step-advancement is commanded of the residual web 2a and the thermoformed objects TO anchored thereto at the witnesses, in order to extract them from the mould and transfer them to a separation station (not illustrated in the drawings).

The incision or recess 89 can be of different configuration, preferably extending for the entire width of the insert block, and it can have cross section configured, for example:
  with circular segment (FIG. 14);
  with circular segment with a cut made at an intermediate portion of its end that, during use, is very close to the sharp counter-edge 17 (FIG. 13);
  triangular (FIG. 15); or
  rectangular (FIG. 17).

Alternatively, the incision can have width much less than the width of the block 9 and can be configured as a channel, for example (see FIG. 16).

According to one variant illustrated in FIGS. 23-25, the inserts are removably anchored to the embossed edge 70 in the counter-cutting element 7, in a manner entirely equivalent to that described with reference to FIGS. 1-12.

A solution according to the present invention, due to the presence of the inserts with configurable profile, allows obtaining witnesses T with uniform, precise sizes independent of the type of thermoformable material used. The recesses or incisions 89, in fact, can have different sizes or shapes, which can be established each time according to the thermoformed object or type of thermoformable material used.

With a solution according to the present invention, it is possible to easily sharpen the cutting components, since one can quickly restore the correct position of the inserts and thus that of the incisions or recesses made thereon, eliminating one or more washers.

The molding unit described above is susceptible to numerous modifications and variants within the protective scope defined by the tenor of the claims.

The invention claimed is:

1. An in-mold cutting unit for a thermoforming machine having at least one mold element, at least one counter-mold element positioned and configured to cooperate, in use, with the respective mold element, and an actuator configured to command a relative movement of said respective mold and counter-mold elements, said in-mold cutting unit comprising:
  at least one annular knife element comprising a sharp edge;
  at least one counter-cutting element for each respective annular knife element, the at least one counter-cutting element defining a sharp counter-edge portion; and
  at least one witness-forming insert configured to be housed removably in a respective reception seat at said at least one annular knife element or said at least one counter-cutting element, and the at least one witness-forming insert delimiting at least one recess or incision thereon, the at least one recess or incision, during use, positioned adjacent to, and extended transversely with respect to, said sharp edge of said at least one annular knife element or to said at least one sharp counter-edge portion configured for formation of a respective witness between at least one thermoformed object and a residual web, where the respective thermoformed object remains anchored to the residual web.

2. The unit according to claim 1, wherein each insert comprises:
  a main cylindrical body delimiting a through opening,
  a block extending from a lateral surface of the main cylindrical body, said at least one recess or incision being delimited at one end of said block.

3. The unit according to claim 2, wherein the respective reception seat comprises a bottom; and
  the cutting unit comprises at least one screw insertable in the through opening delimited by said cylindrical body and engageable in a hole made on the bottom of the respective reception seat so as to fix a respective insert in position.

4. The unit according to claim 3, comprising at least one shim arranged between the bottom of said seat and the respective insert.

5. The unit according to claim 2, wherein said at least one incision or recess extends for at least part of a width of said block of said at least one insert and has a cross section.

6. The unit according to claim 5, wherein said cross section has a configuration selected from among:
  circular segment configuration;
  circular segment configuration with a cut made at an intermediate portion of an end of the at least one witness-forming insert that is free during use;
  triangular configuration; and
  rectangular configuration.

7. The unit according to claim 2, wherein said at least one incision or recess is configured as a channel and has a width that is less than the width of said block.

8. The unit according to claim 1, comprising at least three angularly-spaced witness-forming inserts.

9. The thermoforming machine comprising the cutting unit according to claim 1.

10. The thermoforming machine according to claim 9, wherein said at least one counter-mold element delimits at least one thermoforming cavity, and said at least one mold element is equipped with at least one pad element.

* * * * *